United States Patent
Valk et al.

(10) Patent No.: US 6,629,583 B2
(45) Date of Patent: Oct. 7, 2003

(54) FIXTURE FOR AN ELEVATOR SYSTEM

(75) Inventors: Mary Ann T. Valk, Glastonbury, CT (US); Bruce E. Zepke, Glastonbury, CT (US); Wei-Quan Ng, South Windsor, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/029,745

(22) Filed: Dec. 21, 2001

(65) Prior Publication Data

US 2003/0116385 A1 Jun. 26, 2003

(51) Int. Cl.$^7$ ................................. B66B 3/00
(52) U.S. Cl. .................. 187/391; 187/395; 187/396; 187/399; 187/413; 187/290
(58) Field of Search ............... 187/391, 290, 187/393, 394, 395, 396, 397, 398, 399, 413; 342/350; 455/15

(56) References Cited

U.S. PATENT DOCUMENTS

| | | | | |
|---|---|---|---|---|
| 3,995,719 A | * | 12/1976 | Mandel et al. | 187/399 |
| 4,032,882 A | | 6/1977 | Mandel et al. | |
| 4,102,437 A | * | 7/1978 | Mandel | 187/399 |
| 4,630,026 A | * | 12/1986 | Lewis | 187/399 |
| 5,218,356 A | * | 6/1993 | Knapp | 342/350 |
| 5,398,783 A | * | 3/1995 | Jacoby | 187/395 |
| 5,679,934 A | * | 10/1997 | Juntunen et al. | 187/395 |
| 5,832,365 A | * | 11/1998 | Chen et al. | 455/15 |
| 6,161,654 A | * | 12/2000 | Sirigu et al. | 187/391 |
| 6,315,083 B1 | * | 11/2001 | Schuster et al. | 187/391 |
| 6,341,668 B1 | * | 1/2002 | Fayette et al. | 187/391 |
| 6,408,986 B1 | * | 6/2002 | Ayano et al. | 187/290 |
| 6,446,761 B1 | * | 9/2002 | Motoyama et al. | 187/391 |
| 2001/0035314 A1 | * | 11/2001 | Yoshida et al. | 187/382 |

FOREIGN PATENT DOCUMENTS

| | | |
|---|---|---|
| EP | 1 103 510 A2 | 5/2001 |
| JP | 03046979 | 12/1989 |
| WO | WO 92/10421 | 6/1992 |
| WO | WO 00/34169 | 6/2000 |
| WO | WO 00/34170 | 6/2000 |

OTHER PUBLICATIONS

Brian McDonough, Wireless NewsFactor, "Think 'E Ink' If You Like Paper", Jun. 6, 2001, http://www.wirelessnewsfactor.com/perl/story/10301.html.

* cited by examiner

*Primary Examiner*—Jonathan Salata
(74) *Attorney, Agent, or Firm*—Gene D. Fleischhauer

(57) ABSTRACT

Fixture for an Elevator System A fixture using an electrophoretic display system is disclosed. Various construction details are developed which enable simplification of the wiring system for the elevator system. In one detailed embodiment, a touchscreen device is used with the electrophoretic device to transmit data to the elevator dispatch controller of the elevator system

20 Claims, 4 Drawing Sheets

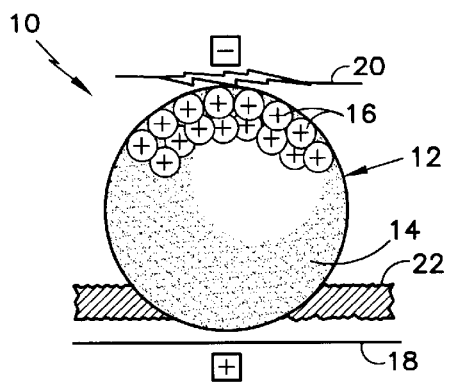
FIG.1
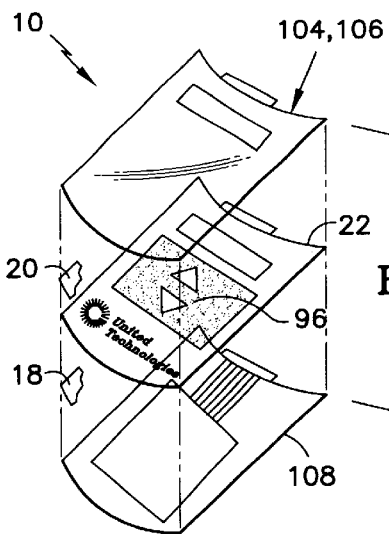
FIG.5
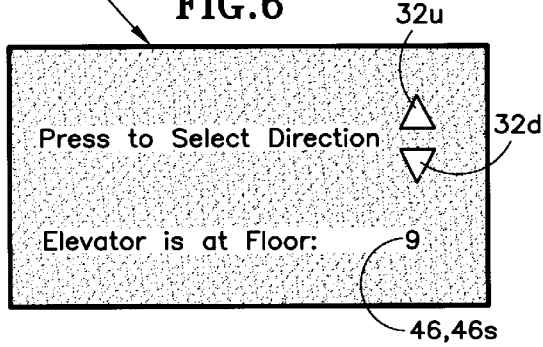
FIG.6
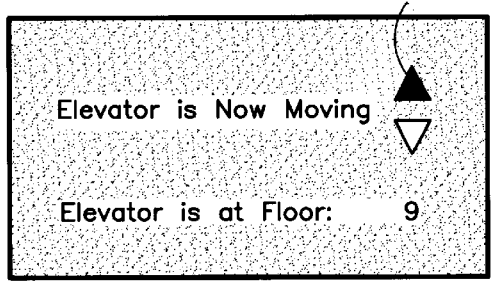
FIG.6A
FIG.7
FIG.7A

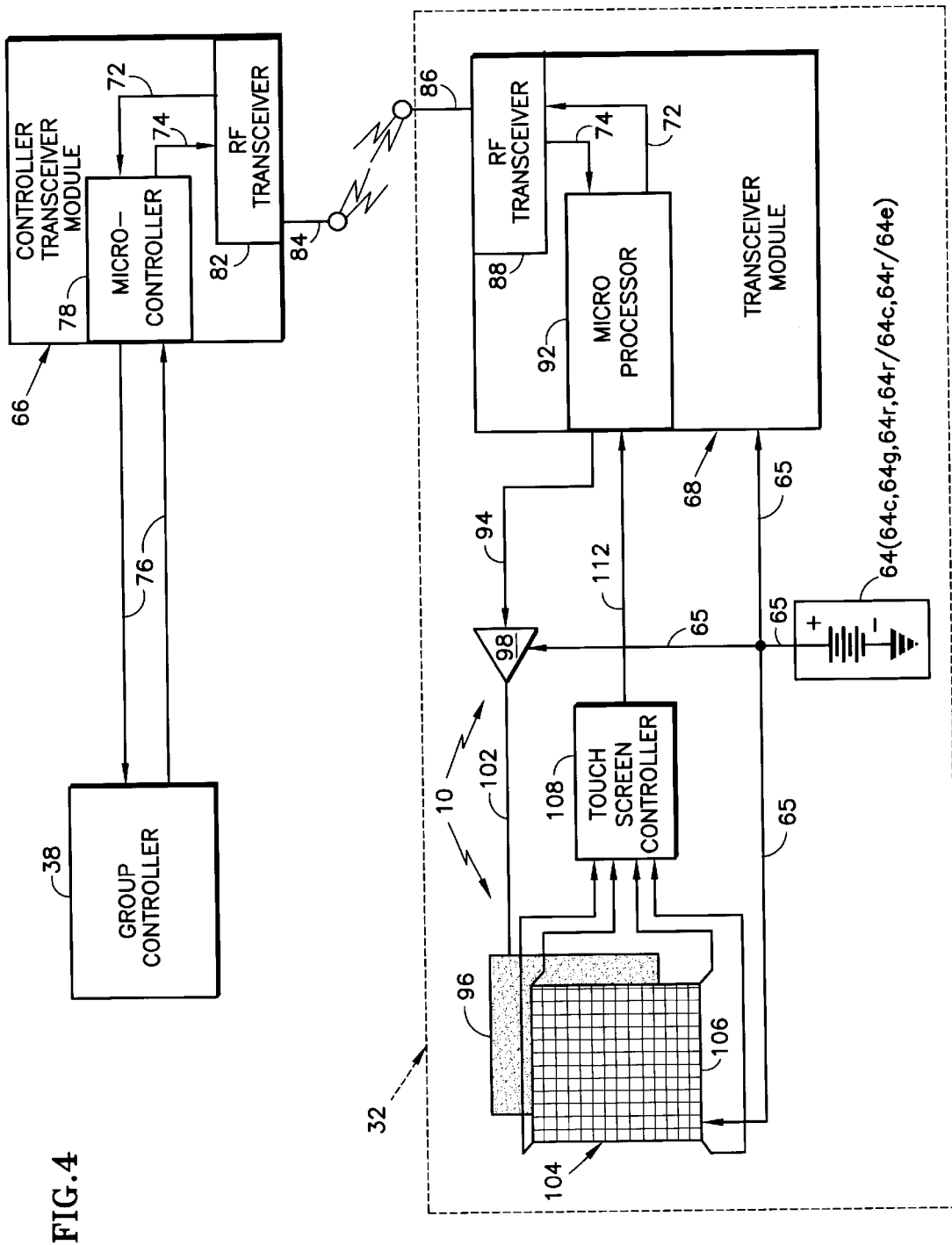

FIXTURE FOR AN ELEVATOR SYSTEM

TECHNICAL FIELD

This invention relates to elevator systems which employ electromagnetic signals for communicating between an elevator dispatch controller and fixtures, such as hall fixtures on each floor, so that the fixtures may be used to enter data to make requests for service and for the elevator system to respond to or inform the viewers on the floors. The elevator dispatch controller may be a group controller for a bank of elevators or a single controller for a single elevator.

BACKGROUND OF THE INVENTION

A conventional elevator system has an installation for each floor which includes an up hall call fixture, such as a request button, for requesting an elevator car from the group controller; and, an associated light for signaling that the group controller has registered the request (except for the highest floor). Similarly, the elevator system includes a down hall call request button with an associated light to indicate that the group controller has registered the request (except for the lowest floor). The elevator system also includes a gong for providing an audible signal that an elevator car is about to arrive.

In addition, on each floor, each elevator hatchway has associated with it a set of hall lantern fixtures that identify which of the elevators is about to arrive, and depending on which of the lantern fixtures is lit, the direction in which the elevator is currently traveling. The highest and lowest floors have only one lantern fixture in a set of lantern fixtures; the remaining floors have two lanterns per set.

Finally, on major floors such as lobby floors, car position indicator fixtures are provided for each elevator in the group, and report the current floor position of the corresponding elevator car. These are generally not provided on each floor because of the expense. The floor position is taken to be equivalent to the committable floor of the car (that is, the next floor where the car could possibly stop, or a floor where it is stopped). Each of these fixtures requires a pair of wires through the hoistway to carry signals to the fixture from the elevator dispatch controller and a pair of wires through the hoistway to carry electrical power to each of the fixtures. This is true whether a single elevator or a group of elevators is used in the installation.

Regardless of how many individual processors are utilized, multi-elevator groups all employ a car controller for each car, and a group controller for the entire group. Each car controller communicates with the corresponding elevator car by means of a traveling cable, and the various car controllers communicate with the group controller over wires. In turn, the group controller communicates over wires with the hall fixtures.

In large systems, that is, several groups each having 15–25 floors, the amount of wire involved in enormous. Whenever upgrading is to be achieved, modifications to the elevator wiring which is embedded in the building can be extremely difficult, if not sufficiently prohibitive so as to confine the nature of the upgrade to that which will conform to the wiring. When upgrades or new elevator systems are to be provided in occupied buildings, the time required to rewire or reconfigure the wiring of a building can be prohibitive, due to the need to have minimal intrusive shutdown of elevators during the work, so that use of portions of the elevator system by paying tenants can continue throughout the work period.

One approach is to use an electromagnetic transceiver to communicate with one or more corresponding transceivers at a floor which are linked to a hall fixture at that floor. One example of this approach is set forth in International Patent Corporation Treaty Application Number WO 00/34169 entitled "Wireless Elevator Hall Fixtures" by Finn et al. which is assigned to the assignee of the present invention.

In Finn, the transceivers send call requests and receive acknowledgments for the hall fixtures and send simple on and off signals to the lights associated with the fixtures. Finn mentions using liquid crystal displays in place of the lights. Finn does eliminate the need for wiring between the controllers and the individual floors, and reduces the wiring necessary on each individual floor for this purpose to a minuscule amount. Finn permits altering fixtures without regard to signal wiring already embedded in the building. Finn does eliminate the need for tremendous amounts of wire and provides flexibility. And, the teaching of Finn may be utilized in new construction to save wire and costs and permit future upgrades, as well as being advantageously used in retrofit and upgrade applications to existing systems. However, Finn does not eliminate the need for wiring to carry power to each of the fixtures and to the lights or liquid crystal displays used in place of the lights.

Accordingly, the above art notwithstanding, scientists and engineers working under the direction of applicants assignee have sought to develop ways of avoiding the need to have power wires extend to each of the fixtures.

SUMMARY OF INVENTION

This invention is in part predicated on the realization that a fixture having an electrophoretic display system is capable of using the electrophoretic display system in connection with wireless communication. It is also in part predicated on the realization that an electrophoretic display system has particular application to elevator systems. This occurs because the wireless communication of information to the electrophoretic display system and the amount of power required to operate the fixture makes possible an independent power source for the fixture. This, in turn, avoids complex and inconvenient wire-like connections to power sources whose remote location makes necessary the complex wiring harnesses discussed above. In particular, this avoids a continuous electrical conductor which extends from the fixture to the hoistway and thence to the power source for the hoistway or for the structure in which the elevator is installed.

An electrophoretic display system 10 is schematically shown in FIG. 1. The electrophoretic display system includes many, many microcompartments, such as microcapsules 12. Each microcapsule contains a liquid 14 and an electrophoretic material 16 disposed in the liquid. Examples of such microcapsules are shown in U.S. Pat. No. 5,961,804 issued to Jacobson et al. entitled "Microencapsulated Electrophoretic Display." An electrophoretic material is a material that moves in response to an electronic field and includes materials which translate or rotate or both translate or rotate in such a field. As discussed by Jacobson et al., electrophoretic materials for the microcapsules include particles or liquids that are reflective or radiant.

In an electrophoretic display system, the microcapsules are disposed adjacent a device, such as the two electrodes 18, 20 shown in FIG. 1, for imposing an electric field on the electrophoretic material. One example of an electrophoretic display system is the E Ink electronic display which is available from the E Ink Corporation, Cambridge, Mass. A liquid "carrier medium" is used in one exemplary process to form an "ink" that carries and fixes the microcapsules onto virtually any surface. This may be done with existing printing processes, such as, for example, screen printing processes. In one embodiment, the E ink is printed onto a sheet of plastic film that is laminated to a layer of circuitry. The layer of circuitry (electrodes) forms a pattern of pixels that can be controlled by a display driver.

The term "electrophoretic display system" also covers a similar embodiment which is known as the Gyricon system. The Gyricon system uses microscopic, charged balls painted half black and half white. The balls float in tiny liquid filled cavities and rotate in response to an electrical field to form a display. The Gyricon system was developed by the Xerox Corp., Palo Alto Research Center, Palo Alto, Calif.

According to the present invention, an elevator fixture has a wireless communications system which has an electrophoretic display system for receiving and communicating visual information to passengers and which has a source of power connected to the electrophoretic display system that receives energy from the elevator system or its surroundings but is independent of continuous electrical conductors that are attached to a supplementary power source which includes the power system for the hoistway and the power system for the housing in which the elevator is installed.

In accordance with one detailed embodiment of the present invention, the fixture includes a first screen for the electrophoretic display system and a second screen (touchscreen) that lies over the first screen. The second touchscreen has raised symbols on the touchscreen which may be perceived by a person who is visually challenged.

In accordance with one detailed embodiment, the electrophoretic display system has reflective particles and is illuminated by ambient lighting and the power source is a photovoltaic cell which receives energy from the ambient lighting.

In accordance with another detailed embodiment, the power source is a galvanic cell.

In accordance with another detailed embodiment, the power source for the electrophoretic display system has a wireless interface with a supplementary source of power by using electromagnetic energy, for example, with an inductive coupling device for providing energy to a rechargeable galvanic cell.

In accordance with another detailed embodiment, the power source is a galvanic cell which receives energy from a photoelectric cell.

In accordance with another detailed embodiment, the electrophoretic display system has a screen which is curved.

In accordance with another detailed embodiment, at least one of the elevator fixtures is selected from the group consisting of the hall lantern, the hall position indicator, the hall call fixture and the car operating panel display.

A primary feature of the present invention is a fixture for an elevator having an electrophoretic display system. Another feature is the power source for the electrophoretic display system. In one particular embodiment, the power source is a galvanic cell. In one detailed embodiment, the power source is a rechargeable galvanic cell.

A principal advantage of the present invention is the level of safety and reduced maintenance cost and time which results from avoiding the use of the hoistway as a source of power that has wires that are mechanically connected at the hoistway and at the fixture for supplying power to the fixture. Another advantage is the cost of installing fixtures, which results from the ability to locally install the fixture without requiring access to the hoistway. In addition, common hardware for the fixture design may be used for elevators installed in different parts of the world by accommodating different requirements for the language that is displayed by the fixture by electronically adjusting the electric field adjacent the electrophoretic material. Another advantage is the cost of maintenance which results from a less cluttered hoistway by not having wiring associated with supplying power to the fixture extend between the hoistway and the fixture.

The foregoing features and advantages of the present invention will become more apparent in light of the following detailed description of the invention and in the accompanying drawing.

BRIEF DESCRIPTION OF DRAWINGS

FIG. 1 is a simplified, schematic view of a microcapsule for an electrophoretic display system showing the relationship of the microcapsule and its particles to the electrical circuitry (electrodes) of the display system;

FIG. 4 is a simplified schematic representation of an elevator dispatch controller and a fixture which is in electromagnetic communication with the controller.

FIG. 5 is a schematic, exploded perspective view of an alternate embodiment of a fixture shown in FIG. 2.

FIG. 6 is schematic representation of an alternate embodiment of a hall call fixture shown in FIG. 2 under a first operative condition of the elevator system in which the fixture displays a schematic representation of both an up hall call fixture signal and down hall call fixture signal.

FIG. 6A is a schematic representation of the hall call fixture shown in FIG. 6 under second operative condition of the elevator system in which the fixture displays a down hall call fixture signal and an up hall lantern fixture signal .

FIGS. 7 and 7A are schematic representations in English and German of an alternate embodiment of the hall call fixture signals and hall lantern fixture signals shown in FIG. 6 under a first operative condition of the elevator system in which the fixture displays a schematic representation of both an up hall call fixture signal and a down hall call fixture signal.

DETAILED DESCRIPTION OF THE INVENTION

Figure 2:
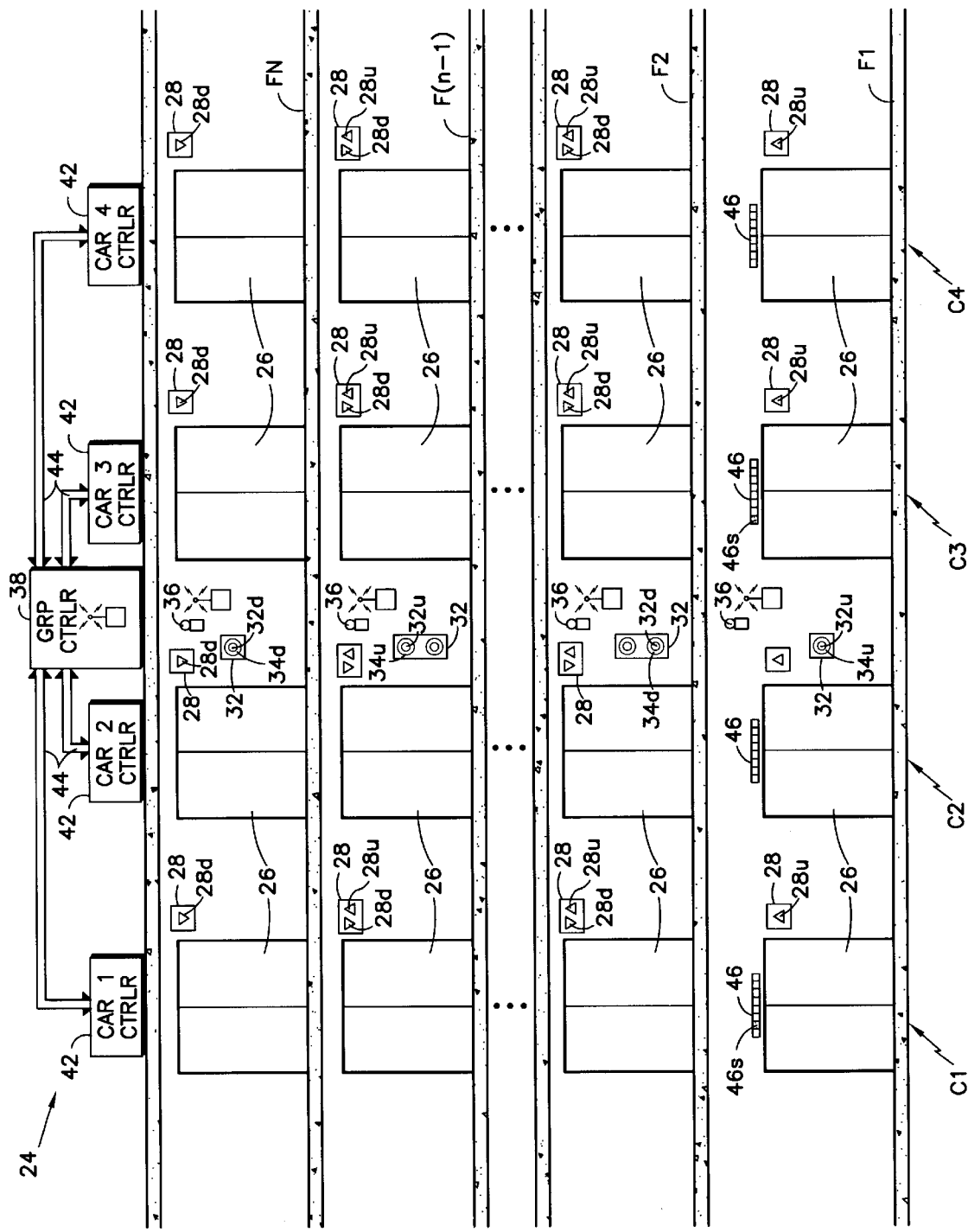
FIG. 2 is a is a simplified, schematic, front plan view of a portion of a structure, as represented by a building, which has an elevator system and which is broken away to show the elevator system.

FIG. 2 shows an elevator system 24 employing the invention that serves a plurality of floors F1–FN. The elevator system has a plurality of elevator hatchways 26. In this embodiment, there are four elevator hoistways C1–C4. Each floor F1 to FN has, for each of the hoistways C1–C4, a lantern fixture 28, as represented by the lantern fixture signals 28d, 28u and a hall call fixture 32, as represented by the button signal 32u and 32d which are one fixture but may be used as separate fixtures. As shown in FIGS. 5, 6, 6A, 7, 7A, the two types of fixtures are combined.

Each lantern fixture 28 has an electrophoretic display system 10 which is shown in more detail and discussed later with regard to alternate embodiments shown in FIGS. 5, 6, 6A, 7, 7A of the system and possible display signals. The lantern fixture has the down lantern fixture signal 28d (or image) for each floor except the lowest floor and the up lantern fixture signal 28u for each floor except the highest floor.

Each of the floors except the top floor FN has a hall call fixture 32 which includes a touchscreen (not shown) and a electrophoretic display system (not shown), as represented by the image (signal) of a request button 32u and the image of an associated call-registered light 34u, that may comprise an image of the conventional "halo" or ring surrounding the button image 32u. Pressing the touchscreen above the button image 32u informs an elevator dispatch controller, as represented by the group controller 38, that a passenger desires a call to travel upwardly from the related floor; and, when the group controller registers the call, it sends a signal back to change the color of the light image 34u so as to inform the passenger that the call has been registered. The fixture on each of the floors except the lowermost floor F1 has a down hall call button image 32d and a corresponding light image 34d. On each floor, a gong 36 is sounded when a car in any one of the hoistways C1–C4 is about to stop on the corresponding floor.

Each of the hoistways C1–C4 has a corresponding car controller 42. The group of car controllers is supervised by the group controller 38. The car controllers are interconnected with the group controller 38 by wire cables 44. This, of course, is not difficult since it occurs on a machine floor where the wiring can be channeled through easily accessible ducts, within the space, rather than in the walls. On important floors, such as lobby floors, each of the hoistways C1–C4 has a car position indicator fixture 46 that at any moment when the car is in service, displays the committable position image 46s of the corresponding car.

Figure 3:
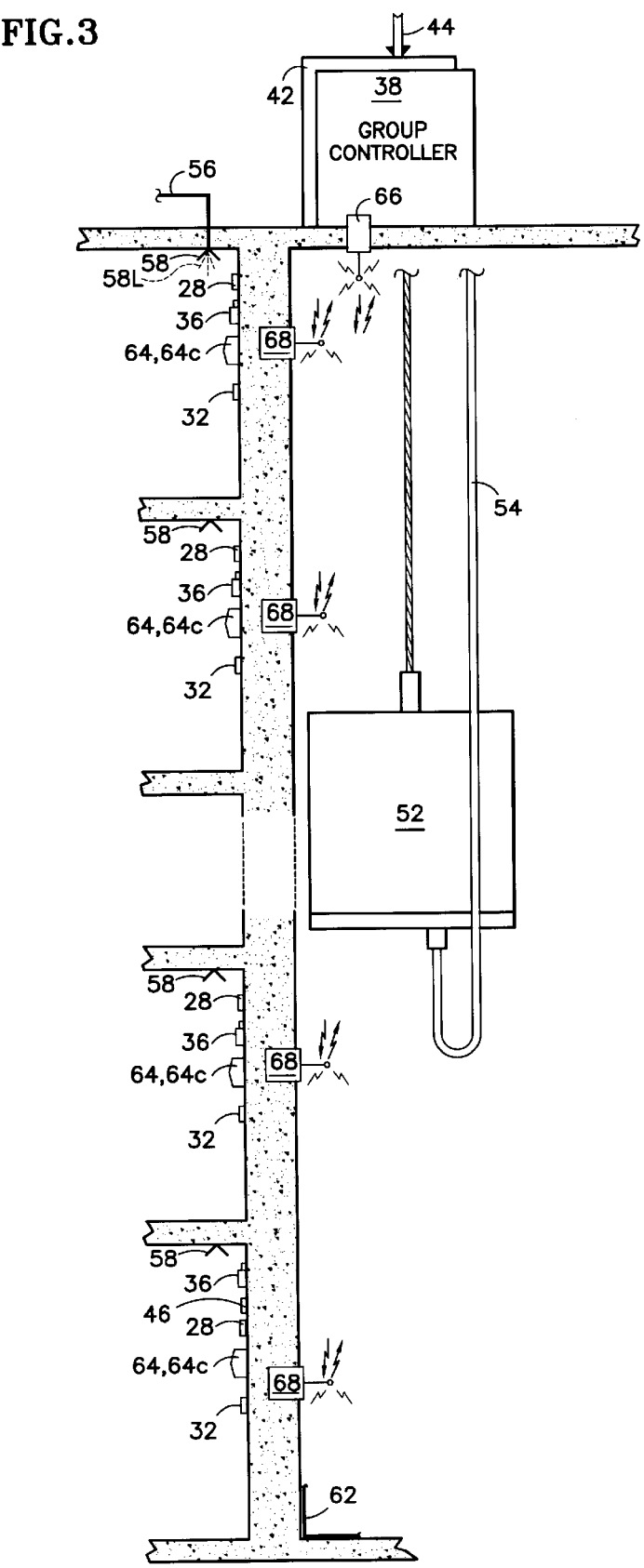
FIG. 3 is a simplified side elevation view of the building shown in FIG. 2 with portions of the building broken away to show a car of the elevator system which is disposed in a hoistway.

As shown in FIG. 3, the conventional elevator car 52 communicates with its car controller 42 by means of a traveling cable 54. The building includes a first source of power, as represented by the power cable 56 which is partially broken away. The power cable is connected by continuous electrical conductors (for example, wires) to a source of illumination, such as a light fixture 58. The building has a light fixture on each floor at the elevator hatchway 26 to illuminate that area. A second source of power for the elevator system is represented by a portion of a continuous electrical conductor, such as a wiring harness 62, which is broken away for clarity. The wiring harness may be electrically connected to an external source of power or to the first source of power for the building. A third source of power, as represented by one or more photovoltaic cells 64c, is illuminated on each floor by the light fixture or by natural light from the exterior of the building. Thus, the illumination is a first source of energy for the third source of power. The third source of power is local to the floor adjacent the hoistway and connected by a continuous electrical connector 65 (shown in FIG. 4) to the fixtures 28, 32, 46. The continuous electrical connector does not extend into the hoistway. The fixtures are not connected by a continuous electrical connector to the first source of power or the second source of power.

FIG. 4 is a schematic representation of the electromagnetic coupling between the elevator dispatch controller 38, such as a group controller or an individual controller for a single elevator and a fixture 32. The fixture 32 has an electrophoretic display 10 system such as is used with the fixtures 28, 32, 46 shown in FIG. 2. As shown in FIG. 2 and FIG. 4, the group controller 38 has an electromagnetic transceiver module 66 which communicates with any and all of the corresponding fixture transceiver modules 68 on each floor of the building. In the present embodiment, it is assumed that the fixtures have locally positioned electronics associated with them to permit operation in response to state commands. For instance, pressing the fixture above one of the call button images 32u, 32d will cause a corresponding signal 72 from the fixture transceiver module 68 of the related floor indicating a request for an up call or a down call on that floor. Similarly, a single signal 74 from the group controller transceiver module 66 addressed to a specific one of the transceiver modules 68 may acknowledge the call request. These signals are thus discrete, and are responded to in order to cause the corresponding desired action. The remainder of the required signals 74 are simply to either display or not display the hall button light image 34u, 34d, a lantern fixture image 32d, 32u or any of the car position indicator images.

As shown in FIG. 4 and mentioned above, the controller transceiver module 66 is linked to the elevator dispatch controller 38 by a continuous electrical conductor, as represented by the arrows 76 representing a two-way flow of information. A continuous electrical conductor exists where an unbroken path exists for the flow of electrical current, such as through a wire or other electrically conductive component. The link might also be provided by an electromagnetic link by being connected by an electromagnetic device. The term "continuous electrical conductor" does not include an electromagnetic link.

The controller transceiver module 66 might be physically part of the elevator dispatch controller 38 or physically displaced from the elevator dispatch controller. The controller transceiver module includes a microcontroller 78, such as a microprocessor, for translating information from the elevator dispatch controller into a signal which is sent by a RF transceiver 82 via an antenna 84.

The fixture 28 includes the fixture transceiver module 68, at least one of the electrophoretic display systems 10, and the third source of power 64. The electrophoretic display system in this particular embodiment is an E Ink system available from the E Ink Corporation, Cambridge, Mass.

The fixture transceiver module 68 includes an antenna 86, a RF transceiver 88 and a microcontroller, as represented by the microprocessor 92. The fixture transceiver module sends data signals 72 from the fixture and receives data signals 74, such as acknowledgments, from the elevator dispatch controller. The fixture transceiver module might be physically part of the remainder of the fixture or physically displaced from the remainder of the fixture. The fixture transceiver module is connected by a continuous electrical conductor 94 to the electrophoretic display system but might also be connected by an electromagnetic device.

The electrophoretic display system 10 is shown in FIG. 4 and as an illustrative alternate embodiment in FIG. 5. FIG. 5 is a schematic representation of one embodiment of this portion of the fixture. As shown in FIG. 4 and FIG. 5, the electrophoretic display system includes a display layer 96. The layer is formed of microcapsules containing the liquid 14 and radiant or reflective particles 16, disposed in the liquid. The principles of the electrophoretic display system is, in itself, not part of this invention.

The microcapsules 12 are attached to a flexible layer of supporting material 22 such as paper or thin film plastic. The paper 22 is broken away for purposes of illustration. As schematically represented in FIG. 1, the display layer includes two electrodes disposed on either side of the flexible layer which are broken away for clarity, as represented by a first electrode 18 disposed below the flexible layer on a flexible material and a second, transparent electrode 20 disposed above the flexible layer. Applying a charge to the electrode causes the positively charged particles 16 (for example, reflective white particles) to move in the liquid 14 to the display side or away from the display side. Particles on the display side cause the microcapsule (or pixel) to appear white; particles on the non-display side appear the color of the liquid (for example, blue).

A display driver 98 is in communication via link 102 with the electrodes 18, 22 to cause the appropriate symbol or letters to appear. The display driver receives information via the link, such as a continuous electrical conductor, as represented by the arrow 94. Alternatively, there might be an electromagnetic link between the microcontroller and the display driver.

The electrophoretic display system 10 might be used alone or might include in some embodiments a touchscreen device 104 as shown in FIG. 4 and FIG. 5. The embodiment shown in FIG. 4 and FIG. 5 includes a resistive touchscreen 106 such as a Densitron touchscreen available from the Densitron Corporation, 10430–2 Pioneer Boulevard, Santa Fe Springs, Calif. 90670. The touchscreen might extend over the entire display layer 96 or over a portion of the display layer where the display layer displays information not requiring an input from the viewer. The Densitron Touchscreen device includes a touchscreen, as, represented by the electronics layer 106 in FIG. 4 and FIG. 5, which is in electrical communication with the Densitron touchscreen controller 108 for sending data, such as a call for an elevator car, from a hall call fixture via link 112 to the transceiver module 68.

The third source of electrical power, as represented by the block 64, might be selected from the group consisting of photovoltaic cells 64c, a rechargeable galvanic cell 64r connected to a charging device, such as a rechargeable galvanic cell connected to photovoltaic cell 64c, or an electromagnetic device 64e which is not directly connected to the first and second sources of power by a continuous electrical conductor. An important advantage is that the third source of power for the fixture is not connected by a continuous electrical conductor to the first source of power in the building or the second source of power in the hoistway. This eliminates the need to have wires extending into the hoistway or the need to rely on and connect to the electrical power system of the building. This provides advantages in upgrading an elevator system whether a single elevator or a bank of elevators is involved. In fact, it may be nearly impossible because of cost and downtime for the elevator system to rewire an existing bank of elevators in an older installation. In such a case, new hall fixtures might be installed in parallel with existing hall fixtures because the new hall fixtures rely only on the third source of power for the energy needed to operate the fixtures.

This is in part made possible by the amount of power required to operate the fixture 28. The electrophoretic display system 10 requires an amount of power which is estimated to be ten to one hundred times less than a liquid crystal display depending on the type of display signaled by the electrophoretic display layer. For example, a fixture having a four inch by four inch display working with a touchscreen 106, display driver 98, touchscreen controller 108 and transceiver module 68 will require less than one hundred fifty milliwatts (150 mW) of power to change the display and nearly no power to maintain the display.

The fixture transceiver module 68 might be directly connected to the second source of electrical power 64 providing that the module does not draw an amount electrical power that is excessive for the second source of electrical power. Accordingly, a particular advantage is the low power required to operate the electrophoretic display system which leaves additional power available to the remainder of the fixture.

The electrophoretic display layer 96 has many advantages. For example, the fixture is flexible and may be curved as shown in FIG. 3 to form curved hall lanterns and position indicators which are viewable through a one hundred eighty (180) degree field. A viewer may see the fixture from the side such as through a side hallway. The viewer is thus informed of the location of the elevator as the viewer moves through the building; and obtains information about the status of the elevator system as the viewer approaches the elevator system.

As mentioned earlier, the elevator system has many operative conditions. An elevator car might be going away from the floor (the viewer), toward the floor, resting at another floor or arriving at the floor. One or more fixtures having electrophoretic display systems 10 may be used to convey information about the car through visual signals as do conventional systems but with certain advantages. For example, a single display layer may display one, more than one, or all hall fixture visual signals such as hall call fixture signals, hall lantern fixture signals, and hall position indicator fixture signals.

FIG. 6 and FIG. 6A are schematic representations of visual signals related to hall fixtures under different operative conditions. As shown in FIG. 6, a touchscreen device 104 may be used to select the "up" call direction by pressing the touchscreen 106 above the outline of the "up" arrow. Upon receiving an acknowledgment from the elevator dispatch controller, the visual signal may change to the configuration shown in FIG. 6A and display the acknowledgment of the call signal. The "Press to Select Direction" signage might appear next to the outline of the "down" call direction. Thus, the hall call fixture signal is displayed at a first location on the display layer and the touchscreen has a first location that is axially aligned with the first location on the display layer such that touching the touchscreen causes the touchscreen to send a call signal to the transceiver module 68. After the call signal has been acknowledged, the display layer displays the hall lantern signal at the first location allowing a single fixture to perform the work of two fixtures (hall call fixture, hall lantern fixture).

Finally, the overall appearance of the display layer may be easily adapted depending on customer preferences, cultures or current needs. A single piece of fixture hardware might be used for installations in the United States and the Federal Republic of Germany, displaying the English language as shown in FIG. 7A or the German language as shown in FIG. 7b. The fixture might be even reprogrammed to display images such as passengers performing required acts to interface with the elevator system, or a symbolic character in a smaller font.

Although the invention has been shown and described with respect to detailed embodiment thereof, it should be understood by those skilled in the art that various changes in form and detail thereof maybe made without departing from the spirit and scope of the claimed invention.

We claim:

1. For an elevator system disposed in a structure having a plurality of floors and a first source of electrical power for the structure, the elevator system having a second source of electrical power for the elevator system which may or may not be connected to the first source of electrical power, the elevator system having at least one hoistway, each hoistway having an elevator car moving vertically therein which is driven by the second source of electrical power to provide service to the floors of the structure, the elevator system having an elevator dispatch controller having an electromagnetic wireless communications system which is adapted to transmit information to a transceiver at a floor, an elevator fixture for the elevator system at an associated floor, which comprises:

an electrohoretic display system having a display layer for communicating at least one visual signal;

a transceiver module at the floor which includes a transceiver and which is linked to the fixture for communicating information to the electrophoretic display system;

a third source of electrical power for the electrophoretic display system; and, a continuous electrical conductor which extends from the third source of electrical power to the electrophoretic display system, the third source of electrical power not being connected by a continuous electrical conductor to the first source of power which extends through the structure and not being connected by a continuous electrical conductor to the second source of electrical power which extends through the hoistway for the elevator system;

wherein the electrophoretic display system, the transceiver module and the third source of electrical power of the fixture are each disposed on the same floor and wherein the transceiver module is in electrical communication with the electrophoretic display system.

2. The elevator fixture for an elevator system as claimed in claim 1 wherein the third source of electrical power is connected by a continuous electrical conductor to the transceiver module.

3. The elevator fixture for an elevator system as claimed in claim 1 wherein the third source of electrical power has a galvanic cell.

4. The elevator fixture for an elevator system as claimed in claim 3 wherein the galvanic cell is a rechargeable galvanic cell.

5. The elevator fixture for an elevator system as claimed in claim 4 wherein a first source of energy is available to the third source of electrical power and the rechargeable galvanic cell receives energy from the first source of energy and wherein the first source of energy receives energy from the first source of electrical power which extends through the structure or the second source of electrical power which extends through the hoistway for the elevator system.

6. The elevator fixture for an elevator system as claimed in claim 5 wherein the structure has a lighting system which receives energy from the first source of electrical power and which provides illumination; wherein the third source of electrical power has at least one photovoltaic cell and wherein the rechargeable galvanic cell is connected to said at least one photovoltaic cell; and, wherein the photovoltaic cell receives energy from illumination provided by the lighting system of the structure.

7. The elevator fixture for an elevator system as claimed in claim 1 wherein the third source of electrical power has at least one photovoltaic cell.

8. The elevator fixture for an elevator system as claimed in claim 5 wherein the third source of electrical power has part of an electromagnetic device which is disposed within the structure, the electromagnetic device having elements that are movable relative to each other for generating electrical power and wherein the rechargeable galvanic cell of the third source of electrical power is connected to said part of the electromagnetic device.

9. The elevator fixture for an elevator system as claimed in claim 1 wherein the elevator system has at least one operative condition, wherein said visual signal is a hall fixture visual signal, and wherein the display layer of the electrophoretic display system under at least one operative condition displays at least one hall fixture visual signal, and wherein the hall fixture visual signal is selected from the group consisting of call fixture signals, call light fixture signals, lantern fixture signals, and car position indicator fixture signals.

10. The elevator fixture for an elevator system as claimed in claim 9 wherein the display layer under said operative condition displays a lantern fixture signal, a call fixture signal, a call light fixture signal and a car position indicator fixture signal.

11. The elevator fixture for an elevator system as claimed in claim 9 wherein the hall lantern fixture signal includes the up lantern fixture signal and the down lantern fixture signal and wherein under one operative condition the display layer displays the up lantern fixture signal at a first location and under a second operative condition displays the down lantern fixture signal at the first location.

12. The elevator fixture for an elevator system as claimed in claim 1 wherein the display layer is curved and projects outwardly from the structure such that the display layer is viewable from a position displaced laterally from the fixture.

13. The elevator fixture for an elevator system as claimed in claim 1 wherein the fixture includes a touchscreen device having a touchscreen disposed over the display layer, the touchscreen being in electrical communication with the transceiver module.

14. The elevator fixture for an elevator system as claimed in claim 13 wherein the touchscreen device is connected by a continuous electrical conductor to the transceiver module.

15. The elevator fixture for an elevator system as claimed in claim 13 wherein the display layer is adapted under one operative condition to display the call fixture signal at a first location on the display layer and, the touchscreen has a first location that is axially aligned with the first location on the display layer such that touching the touchscreen causes the touchscreen to send a call signal to the transceiver module, and under another operative condition after the call signal has been acknowledged, the fixture is adapted to display the lantern fixture signal at the first location.

16. The elevator fixture for an elevator system as claimed in claim 15 wherein the touchscreen at the first location has projections extending from the surface which are adapted by the configuration of the projections to be associated with a tactile character or symbol for a hall call fixture.

17. The elevator fixture for an elevator system as claimed in claim 1 wherein the electrophoretic display system has a display layer formed in part with reflective particles and wherein the structure has a lighting system which illuminates the display layer.

18. The elevator fixture for an elevator system as claimed in claim 1 wherein the electrophoretic display system has a display layer formed in part with particles of radiant electrophoretic materical.

19. The elevator fixture for an elevator system as claimed in claim 1 wherein the transceiver module is connected by a continuous electrical conductor to the electrophoretic display system.

20. The elevator fixture for an elevator system as claimed in claim 9 wherein the fixture is the car position indicator fixture and includes a touchscreen disposed over the display layer, the touchscreen being in electrical communication with the transceiver module and wherein the touchscreen extends over the car position indicator fixture and is adapted to generate a signal to the elevator dispatch controller identifying the floor which is requested for the arriving car.

* * * * *